June 28, 1938. J. A. FLEISCHLI ET AL 2,121,957
APPARATUS FOR SECURING VALVE STEMS TO RUBBER TUBES
Filed April 29, 1935 4 Sheets-Sheet 1

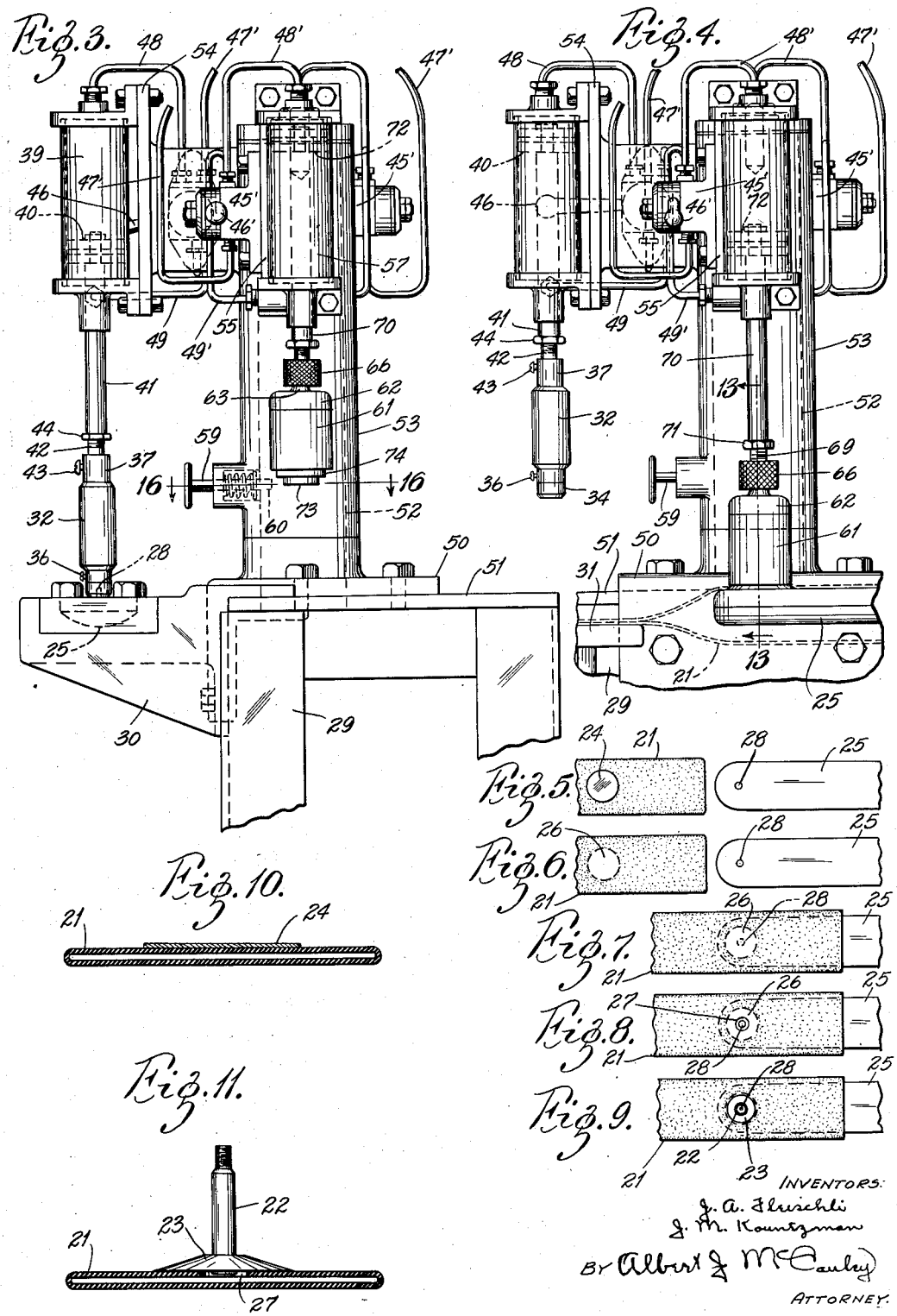

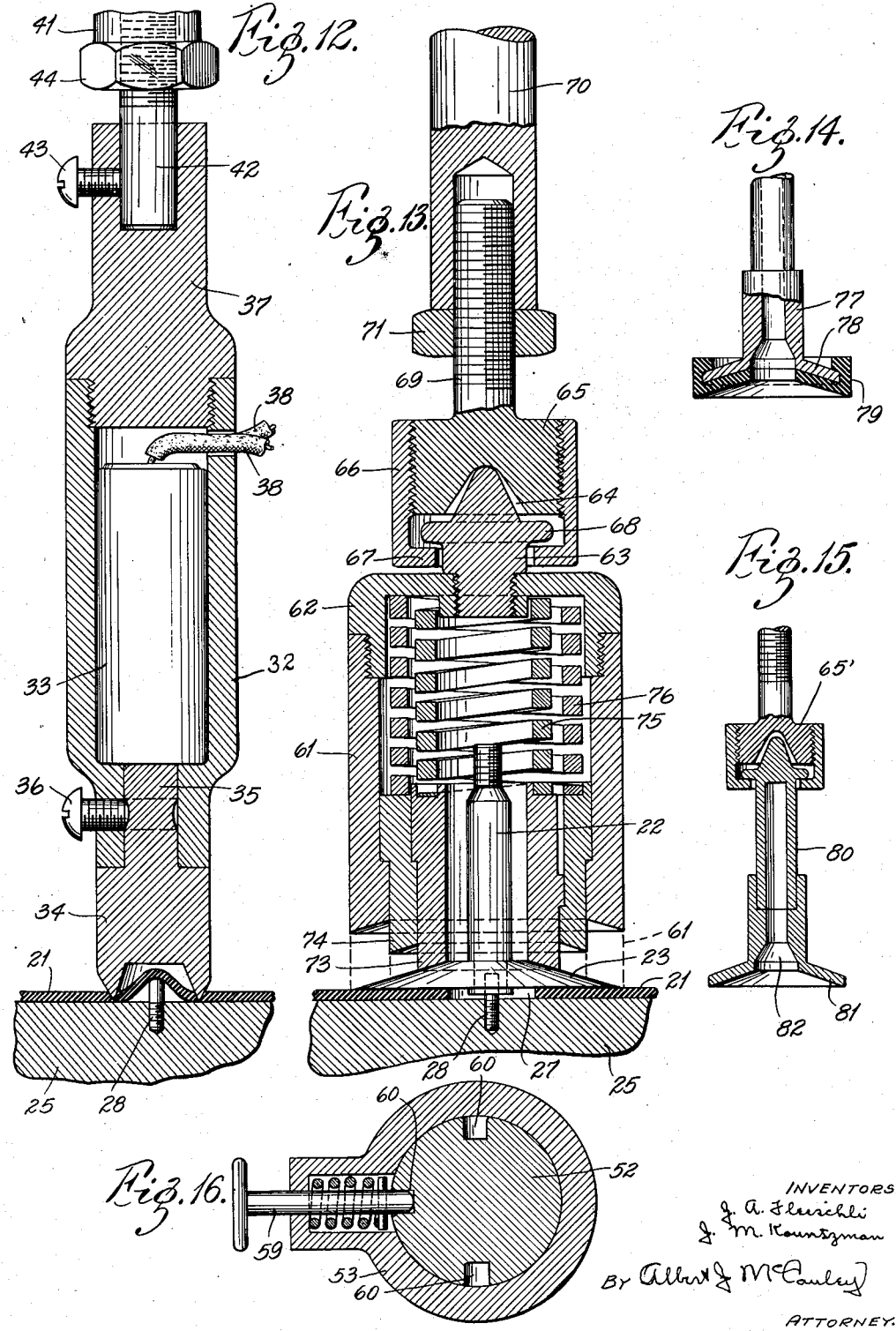

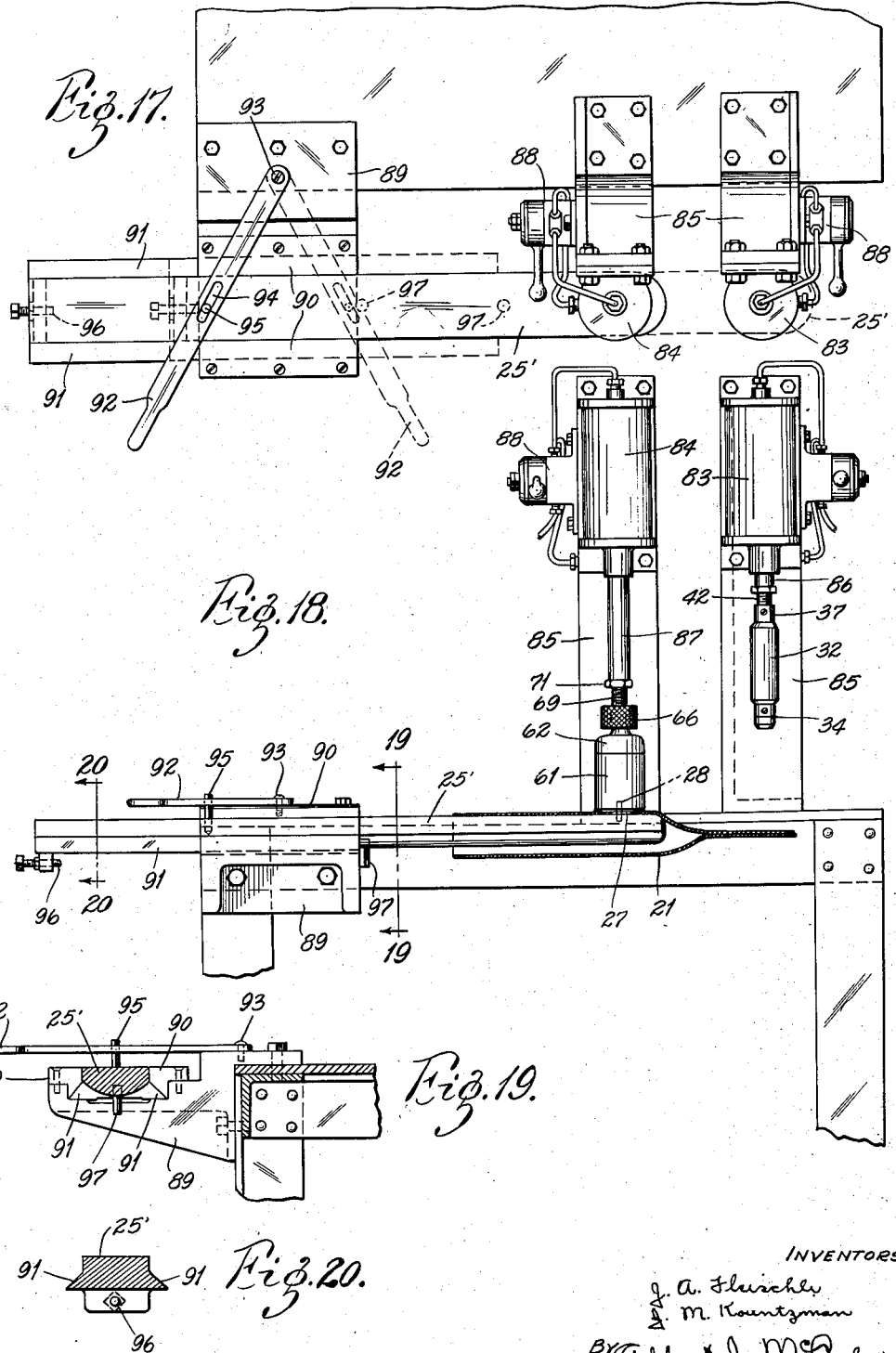

Patented June 28, 1938

2,121,957

UNITED STATES PATENT OFFICE 2,121,957

APPARATUS FOR SECURING VALVE STEMS TO RUBBER TUBES

John A. Fleischli and Joseph M. Kountzman, St. Louis, Mo., assignors to Cupples Company, Manufacturers, St. Louis, Mo., a corporation of Missouri Application April 29, 1935, Serial No. 18,778

19 Claims. (Cl. 154—9)

This invention relates to apparatus for securing valve stems to rubber tubes. One of the objects is to produce a simple and effective means for perforating a rubber tube and thereafter securing the base of a valve stem to the area around the perforation. A further object is to quickly and accurately perform these successive operations in a predetermined clean area of the rubber tube, where the base of the valve stem is cemented to the tube.

In one form of the invention a patch is adhesively secured to an uncured tube in the area selected for the valve stem, and soapstone or other non-adhesive material is thereafter applied to the outer face of the uncured tube. A large number of the tubes can be thus prepared for successive handling in performing various operations. Immediately before the perforating operation, the patch is removed to expose a clean area of uncured rubber to receive the base of the valve stem.

One of the objects of the invention is to quickly and accurately locate this clean area in alinement with a punching device which forms a perforation in said area. We will also show how the base of the valve stem can be very firmly cemented to a portion of the clean area around the perforation.

In performing these operations, a separating member preferably lies within the tube which is moved on the separating member to locate said clean area in alinement with the perforating punch, and to insure the desired accuracy in this alinement we have provided an indicator which shows the location of the clean area with relation to the punch. We have also shown how the valve stem can be accurately located and held in the desired position at said area before the base of the stem is pressed onto the tube, and the elements are arranged to insure a high degree of accuracy in alining the work with the punch and pressing device which performs successive operations in concentric areas.

With the foregoing and other objects in view, the invention comprises the novel construction, combination and arrangement of parts hereinafter more specifically described and shown in the accompanying drawings, which illustrate one form of the invention. However, it is to be understood that the invention comprehends changes, variations and modifications which come within the scope of the claims hereunto appended.

Fig. 3 is a side view.

Fig. 4 is a fragmentary front view showing the pressing device in its operative position.

Fig. 5 is a detail view showing a portion of the rubber tube with a protective patch thereon.

Fig. 6 is a view similar to Fig. 5, with the patch removed to expose a clean area of the tube.

Fig. 7 shows the tube applied to a separating anvil which extends into the tube.

Fig. 8 shows the perforation formed in the clean area while the tube is on the separating anvil.

Fig. 9 shows the base of a valve stem applied to the clean area around the perforation.

Fig. 10 is a cross-section on a larger scale, showing the removable protective patch on the tube.

Fig. 11 is a view similar to Fig. 10 showing the valve stem with its base in the area previously covered by the removable patch.

Fig. 12 is an enlarged vertical section taken approximately on the line 12—12 in Fig. 2, showing the perforating punch in its operative position.

Fig. 13 is an enlarged vertical section approximately on the line 13—13 in Fig. 4, showing a yieldable presser adapted to force the base of the valve stem onto the area around the perforation in the tube.

Fig. 14 is a fragmentary view showing another form of the yielding presser.

Fig. 15 is a vertical section showing a presser having a rigid base and a coupling device yieldingly securing said presser to a thrust member.

Fig. 16 is an enlarged section on the line 16—16 in Fig. 3.

Fig. 17 is a top view showing another form of the machine.

Fig. 18 is a front view of the machine shown in Fig. 17, with the lower portion of the supporting frame broken away.

Fig. 19 is a section on the line 19—19 in Fig. 18.

Fig. 20 is a section on the line 20—20 in Fig. 18.

Figures 1, 2:
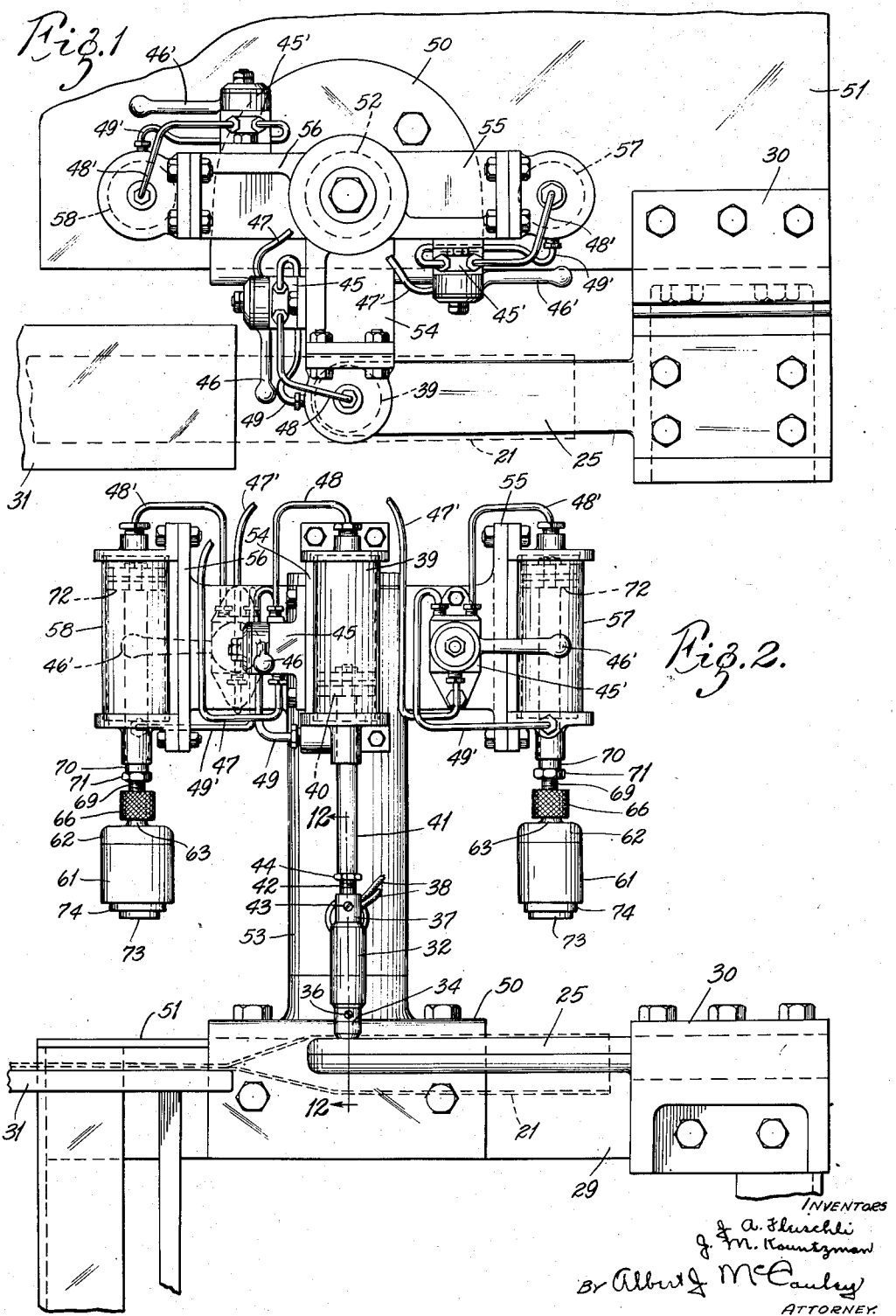
Fig. 1 is a top view of a machine embodying the features of this invention.
Fig. 2 is a front view showing the perforating device in its operative position.

Before describing details of the machine, we will refer to Figures 5 to 9, inclusive, which illustrate successive conditions of the tube, and Figures 10 and 11, which illustrate the initial and final conditions.

The rubber tube 21 may be regarded as an uncured inner tube for pneumatic tires. The valve stem 22 (Fig. 11) may be made of any suitable material having a base 23, preferably of semi-cured rubber to be cemented onto the tube. After the tube is formed, a protective patch 24 is located at the position desired for the valve stem, and owing to the adhesive condition of the raw rubber, the patch will readily adhere to the tube. Soapstone, or other non-adhesive material is then applied to the outer face of the tube, so that it can be readily handled in performing subsequent operations.

This patch 24 (Figs. 5 and 10) may be in the form of a disk, made of bakelite, which is a hard, stiff material that can be readily applied to the raw rubber and easily and quickly removed therefrom when the tube reaches the machine herein disclosed. Furthermore, these firm and durable patches are cleaned and reused an indefinite number of times, instead of being discarded when removed from the tubes.

Fig. 5 shows an end portion of the tube 21 provided with the protective patch 24, and a separating anvil 25 adapted to lie within the tube. The first step performed at the machine consists in removing the stiff patch to expose a clean area of raw rubber shown at 26 in Fig. 6. The tube is slipped onto the separating anvil 25 which lies within the tube, as shown in Figures 2 and 7, to separate the oppositely disposed walls of the tube. The tube is movable on the separating anvil to locate the clean area in a predetermined position wherein it is alined with a punch to be hereafter described, which forms the perforation 27, shown in Fig. 8.

Thereafter, the base 23 of the valve stem 22 is seated on the clean area around the perforation, as shown in Figs. 9 and 11, and a high degree of pressure is applied to the top face of said base to firmly force the base onto the rubber tube. The bottom face of said base is coated with cement, so the high pressure properly applied to the top face will insure a very firm union between the tube and the valve stem base.

After these operations are performed, the rubber may be cured, or vulcanized, in any suitable manner.

Aside from the importance of providing a highly efficient means for quickly performing the perforating and pressing operations, one of the problems appears in properly alining the selected clean area of the tube with the perforating and pressing devices. Another point lies in quickly locating the valve stem in an area approximately concentric with the perforation, and in holding it there during the interval between the perforating and pressing operations.

This involves a suitable alining means, and to illustrate a simple form of the invention we have disclosed an indicator which shows when the clean area of the tube is alined with the perforating punch, and this indicator may also serve as the means for alining the valve stem with the pressing device, as well as a holder to prevent shifting of the valve stem before it is secured to the tube.

Briefly stated, a device having these functions may be a simple centering pin 28 (Figs. 6 and 12) projecting from the top face of the separating anvil 25 which lies within the tube. During the perforating operation, this pin 28 is alined with the punch as shown in Fig. 12, and during the pressing operation, said pin is alined with the pressing device, as shown in Fig. 13.

While the pin 28 lies within the tube 21 it will be understood that the tube is made of very flexible uncured rubber, and as the tube is moved along the separating anvil 25 a noticeable bulge, or projection, will be formed in the top face of the tube directly above said pin. When this bulge appears near the center of the clean area 26, the operator will know that the tube is positioned for the perforating operation, so the manually controlled punch can then be operated to form the perforation 27 around the pin 28, as suggested in Fig. 12.

The pin 28 is then exposed at or near the center of the perforation. It is not necessary to precisely locate the pin at the center of the perforation, as the clean circular area is larger than the diameter of the valve stem base.

After the perforation is formed, the location for the center of the valve stem is quickly determined by merely placing said stem on the pin 28, with the pin inside of the tubular valve stem, as shown in Fig. 13. The center of the valve stem 22 is thus located at the perforation 27, and the base of the valve stem is positively located in a clean area concentric with the pin. Furthermore, the pin 28 is interlocked with the valve stem to prevent accidental displacement of the valve device before it is cemented to the tube.

Therefore, the pin 28 may be regarded as one form of the means for indicating the location of the area to be perforated, and from another viewpoint it is considered as a means for locating and holding the valve stem. More specifically stated, said pin is a combined valve stem holder and alining member having two separate and distinct functions, but it will be understood that the scope of the invention is to be determined by the claims, and not by this specific description of one form of the invention.

Figures 1 to 4, inclusive, show a form of the invention wherein the perforating and pressing devices are carried by an oscillatory turret which enables them to be successively alined with the area previously selected for the valve stem.

Figures 17 to 20 illustrate a form wherein the separating anvil 25' in the tube is shifted to move the selected area from a position alined with the center of the perforating device, to a position in alinement with the center of the pressing device. In each form the separating anvil 25 or 25' is provided with an operating station where the perforating and pressing operations are performed, but in one case the punch and presser are shifted laterally for the successive operations, and in the other form the separating anvil carries the tube from the perforating station to the pressing station.

Referring now to Figures 1 to 4, inclusive, 29 indicates a supporting frame provided with a bracket 30 to which the separating anvil 25 is rigidly secured. A table 31 (Fig. 1) near one end of the separating member 25 is adapted to receive a pile of the tubes 21. The operator takes the top tube of the pile and moves it onto the separating anvil, so as to locate the previously selected clean area of said tube in alinement with the indicating pin 28 on said anvil. The separating anvil and its indicating pin 28 are then located within the tube 21, but the pin forms an indicating bulge on the top face of the flexible tube which shows the location of the area to be perforated.

The perforator is then alined with this area and it may be moved downwardly to form the perforation as shown in Figures 2 and 12.

This perforating device comprises a cylindrical heating chamber 32 (Fig. 12) containing an electrical heating element 33, and a punch member 34 extending from the bottom of said heating chamber. The punch member has a circular cutting edge at the bottom and a projection 35 at the top extending into the bottom of the heating chamber 32 and detachably secured by means of a set screw 36. The top of the heating chamber is closed by a member 37 (Fig. 12) screwed into the heating chamber and removable therefrom to permit removal of the heating element 33. Flexible conductors 38 extend through one side of the heating chamber 32, said conductors being detachably secured to the heating element 33.

To illustrate a suitable means for operating the perforating device, we have shown a vertical cylinder 39 containing a piston 40 provided with a piston rod 41, an adjusting rod 42 screwed into the lower end of said piston rod, and a set screw 43 (Fig. 12) securing said rod 42 to the member 37 at the top of the heating chamber. Since the rod 42 is screwed into the lower end of the piston rod 41, it will be understood that said rod 42 can be adjusted to accurately locate the cutting edge of the punch in the desired cutting position with relation to the separating anvil 25, shown in Fig. 12. After the rod 42 is properly adjusted it may be secured by means of a jamb nut 44 engaging the bottom of the piston rod 41.

The piston 40 may be actuated by compressed air, or other fluid under pressure, to move the punching device toward and its heating element toward and away from the separating anvil 25. A valve 45 having an operating handle 46 is provided with an air supply tube 47, a tube 48 which extends from the valve to the top of the cylinder 39, and a tube 49 leading from said valve to the bottom of said cylinder. This valve device may be constructed in any suitable manner to control the delivery of compressed air to and from the cylinder 39. The valve is controlled by an operator who manipulates the handle 46 with the result of moving the punching device downwardly to form the perforation, and then upwardly to a position substantially above the tube 21. The hot punch will very readily cut the uncured rubber, and the small disk of rubber removed in forming the perforation is readily discharged from the punch.

In the machine shown by Figures 1 to 4, inclusive, the punching and pressing operations are performed at an operating station near one end of the separating anvil 25, which is rigidly fixed to the bracket 30. The indicating pin 28 (Figures 6, 7 and 12) lies at the center of this operating station, and the perforating and pressing devices are secured to a movable carrier which enables them to be successively located in operating positions where they are in vertical alinement with said indicating pin 28.

The means for supporting the perforating and pressing devices comprises a base 50 secured to a table 51, a vertical post 52 (Figures 3, 4 and 16) extending upwardly from said base, an oscillatory tube 53 surrounding said vertical post, and brackets 54, 55 and 56 extending from said oscillatory tube. The bracket 54 carries the cylinder 39 at the perforating device. The bracket 55 carries a cylinder 57 for a relatively small pressing device, while the bracket 56 carries a cylinder 58 for a larger pressing device. The object in having two pressing devices is to provide a means for pressing both the large and smaller valve stem bases onto tubes. Either of the pressing devices can be selected for the pressing operation.

Since the perforating and pressing devices are carried by the vertical tube 53 which may be rotated or oscillated on the post 52, it will be understood that either of these devices can be alined with the operating station on the separating anvil 25. A spring pressed locking pin 59 (Figures 3 and 16), carried by the oscillatory tube 53, is adapted to enter into any one of three recesses 60 formed in the stationary post 52, so as to lock the carrier in any one of its three operative positions.

The large and small pressing devices may be exactly alike, with the exception of dimensions, so a description of one will suffice for both.

Each of the pressing devices shown in Figures 1 to 4, includes pressing elements having details more clearly shown in Fig. 13. An outer tube 61 is provided with a cap 62 having a stem 63 which extends into a socket 64 formed in the bottom of a thrust member 65. A coupling member 66, screwed onto the thrust member 65, is provided with an inturned flange 67 forming a seat for a flange 68 on the stem 63. The stem 63 is thus loosely coupled to the thrust member 65, so as to permit tilting of the pressing elements below the thrust member. Therefore, the bottom of the pressing device will be automatically adjusted on the beveled top face of the valve stem base 23, to insure a proper distribution of the pressure in the area on which the pressing device is seated.

The thrust member 65 has a threaded stem 69 screwed into the lower end of the piston rod 70 to permit vertical adjustment of the pressing device. A jamb nut 71 on the stem 69 engages the piston rod 70 to prevent accidental displacement after the desired adjustment is obtained.

Fig. 2 shows that each of the piston rods 70 is provided with a piston 72 in one of the cylinders 57 or 58, and it will be understood that each of these cylinders may be equipped with a valve 45' having a handle 46' and tubes 47', 48' and 49' corresponding to the elements previously described in referring to the punching device. However, any suitable means may be employed to actuate these punching and pressing devices.

Again referring to the pressing device shown in Fig. 13, the pressing elements include the outer tube 61, an inner tube 73, and an intermediate tube 74 between said inner and outer tubes. A spring 75 is interposed between the cap 62 and the top of the inner tube 73, and another spring 76 lies between said cap and the intermediate tube. When the device is not in service, the pressure of the springs locates the telescoping tubes in the relative positions shown in Fig. 13, where they are retained by stop shoulders formed on said tubes.

Each of these telescoping tubes has a beveled bottom face conforming to the inclination of the top face of the beveled valve stem base 23. However, the beveled bottom face of the intermediate tube 74 is lower than the bottom of the outer tube; and the lower portion of the inner tube extends downwardly from the intermediate tube.

Therefore, in response to a downward movement of the pressing device, the initial pressure is exerted in a circular area near the center of the valve stem base 23, and as the downward motion continues, the intermediate tube 74 is forced onto the next adjacent area, which is followed by pressure from the outer tube 61 at the peripheral margin of the base.

One of the advantages obtained by pressing and smoothing the base 23 in relatively small successive areas, beginning at the relatively thick central portion of the base, lies in the discharge of air that may otherwise be trapped between said base and the rubber tube 21, and since the pressure is very firmly exerted in each of these circular areas around the valve stem, the base 23 is securely united with the rubber tube.

Another advantage is gained by loosely coupling the pressing elements to the thrust member 65, as shown in Fig. 13, and thereby permitting the presser to tilt and adjust itself to the top face of the base 23 in response to the pressure exerted during the pressing operation.

Fig. 14 illustrates a yieldable presser having a tubular stem 77 to receive the valve stem, a flange 78 at the lower end of said stem, and a rubber pressing element 79 interlocked with said flange to provide a cushion which yieldingly transmits the pressure to the base of the valve stem.

Another form of the yieldable pressing element appears in Fig. 15 wherein the thrust member 65' is loosely coupled to a stem 80 provided with a pressing member 81 having a central opening 82 to receive the valve stem. In actual practice, this simple form of the pressing device has given good results, but the yieldable device shown in Fig. 13 has additional advantages due to the successive pressures in concentric areas.

The machine shown by Figures 17 to 20 includes cylinders 83 and 84 rigidly secured to stationary brackets 85, and piston rods 86 and 87 extending from the respective cylinders. These cylinders may be provided with suitable hand-operated valves 88 to control the delivery of compressed air to and from the cylinders, as described in referring to Figures 1 to 4. The piston rod 86 is equipped with a punch including the perforating member 34 and heating chamber 32, which may conform approximately to the device shown in Fig. 12. The piston rod 87 is provided with a presser including the outer tube 61 and the cap 62, as well as other details of the pressing device shown in Fig. 13.

The separating anvil 25' shown in Figures 17 to 20 is slidably fitted to a guideway formed in a stationary bracket 89, said bracket having guide bars 90 which engage beveled ribs 91 on the slidable anvil. To illustrate a simple means for moving this anvil, we have shown a lever 92, pivoted at 93 and provided with a slot 94 to receive a pin 95 projecting from the top of said anvil.

This anvil 25' is also equipped with the combined centering pin and valve stem holder, shown at 28 in Fig. 18. The anvil 25' may occupy the position shown by full lines wherein the centering pin 28 is alined with the pressing device, or the position shown by dotted lines in Fig. 17, wherein said centering pin is alined with the perforating device. These two positions are determined by stop members 96 and 97 located at the bottom of the anvil 25' and adapted to engage opposite sides of the stationary bracket 89.

In using the apparatus shown by Figures 17 to 20, successive operations are performed approximately as illustrated in Figures 5 to 9. At the beginning, the separating anvil 25' is located in the position shown by dotted lines in Fig. 17 to locate the centering pin in alinement with the punch 34. The tube 21 is slipped onto the anvil, and adjusted thereon by hand, to locate the selected area for the valve stem at the centering pin 28, as previously described, and the punching device is then operated to form the perforation around said centering pin. Thereafter, the valve stem is applied to the centering pin 28 and the anvil is shifted to aline said pin with the pressing device, whereupon, the pressing device is moved downwardly to the position shown in Fig. 18, so as to force the valve stem base onto the tube in the manner previously described in referring to Fig. 13.

In each of the machines herein shown, the separating anvil is provided with a station at the centering pin 28 where the perforating and pressing operations are performed. The perforating and pressing devices are movable toward and away from said operating station at the centering pin, so as to form the perforation around said pin and thereafter cement the valve stem base to the previously selected clean area around the perforation. However, it is to be understood that the invention extends to modifications within the scope of the following claims.

We claim:

1. In an apparatus for perforating a rubber tube in a predetermined area and thereafter cementing the base of a valve stem to a portion of the area around the perforation, a separating member adapted to lie within the tube in a position immediately below said predetermined area, a perforating device including a punch cooperable with said separating member to form the perforation in said predetermined area, the tube being movable on said separating member to aline said predetermined area with the punch, a pressing device to force the base of the valve stem onto said portion of the area around the perforation, said pressing device having an opening to receive the valve stem and a pressing element around said opening, and operating means to successively actuate said perforating device and pressing device while said separating member lies below said predetermined area.

2. In an apparatus for perforating a rubber tube in a predetermined area and thereafter cementing the base of a valve stem to a portion of the area around the perforation, a separating member adapted to lie within the tube in a position immediately below said predetermined area, a perforating device including a punch cooperable with said separating member to form the perforation in said predetermined area, the tube being movable on said separating member to aline said predetermined area with the punch, a pressing device to force the base of the valve stem onto said portion of the area around the perforation, said pressing device having an opening to receive the valve stem and a pressing element around said opening, and operating means to successively actuate said perforating device and pressing device while said separating member lies below said predetermined area, said separating member being provided with an operating station where the perforating and pressing operations are performed, and said perforating and pressing devices being movable toward and away from said operating station.

3. In an apparatus for perforating a rubber tube in a predetermined area and thereafter cementing the base of a valve stem to a portion of the area around the perforation, a separating member adapted to lie within the tube in a position immediately below said predetermined area, a perforating device including a punch cooperable with said separating member to form the perforation in said predetermined area, the tube being movable on said separating member to aline said predetermined area with the punch, a pressing device to force the base of the valve stem onto said portion of the area around the perforation, said pressing device having an opening to receive the valve stem and a pressing element around said opening, and operating means to successively actuate said perforating device and pressing device while said separating member lies below said predetermined area, said perforating and pressing devices being located at different stations where the perforating and pressing operations are performed, and said separating member being movable to shift said predetermined area of the tube from one of said stations to the other.

4. In an apparatus for perforating a rubber tube in a predetermined area and thereafter cementing the base of a valve stem to a portion of the area around the perforation, a separating member adapted to lie within the tube in a position immediately below said predetermined area, a perforating device including a punch cooperable with said separating member to form the perforation in said predetermined area, the tube being movable on said separating member to aline said predetermined area with the punch, a valve stem holder on said separating member, said valve stem holder being covered by the tube before the perforation is formed and thereafter exposed at the perforation, and a pressing device to force the base of the valve stem onto said portion of the area around the perforation, said pressing device having an opening to receive the valve stem and a pressing element around said opening, and operating means to successively actuate said perforating device and pressing device while said separating member lies below said predetermined area.

5. In an apparatus for perforating a rubber tube in a predetermined area and thereafter cementing the base of a valve stem to a portion of the area around the perforation, a separating anvil adapted to lie within the tube in a position immediately below said predetermined area, a perforating device including a punch cooperable with said separating anvil to form the perforation in said predetermined area, the tube being movable on said separating anvil to aline said predetermined area with the punch, a valve stem holder projecting from the top face of said anvil, said valve stem holder being covered by the tube before the perforation is formed and thereafter exposed at the perforation, and a pressing device to force the base of the valve stem onto said portion of the area around the perforation, said pressing device having an opening to receive the valve stem and a pressing element around said opening, and operating means to successively actuate said perforating device and pressing device while said separating anvil lies below said predetermined area.

6. In an apparatus for applying valve stems to rubber tubes having predetermined areas for the bases of the valve stems, a separating member adapted to lie within the tube, a perforating device including a punch cooperable with said separating member to perforate the tube in the area selected for the valve stem, an indicator showing the location of said area with relation to the punch, and a pressing device to force the base of the valve stem onto a portion of the area around the perforation, said pressing device having an opening to receive the valve stem and a pressing element around said opening.

7. In an apparatus for applying valve stems to rubber tubes having predetermined areas for the bases of the valve stems, a separating member adapted to lie within the tube, a perforating device including a punch cooperable with said separating member to perforate the tube in the area selected for the valve stem, an indicator to show the location of said area with relation to the punch, said indicator being extended from the top of said separating member and covered by the tube before the perforation is formed, and a pressing device to force the base of the valve stem onto a portion of the area around the perforation, said pressing device having an opening to receive the valve stem and a pressing element around said opening.

8. In an apparatus for applying valve stems to rubber tubes having predetermined areas for the bases of the valve stems, a separating anvil adapted to lie within the tube, a perforating device including a punch to perforate the tube in the area selected for the valve stem, a valve stem holder on the top face of said separating anvil, said valve stem holder being exposed at the perforation in the tube, and a pressing device to force the base of the valve stem onto a portion of the area around the perforation, said pressing device having an opening to receive the valve stem and a pressing element around said opening.

9. In an apparatus for applying valve stems to rubber tubes, a separating member adapted to lie within the tube, a perforating device including a punch to perforate the tube in the area selected for the valve stem, and a pressing device to force the base of the valve stem onto a portion of the area around the perforation, said pressing device having a yieldable presser member automatically adjustable to conform to said base in response to the initial pressure exerted by said presser member, and the said presser member being provided with an opening to receive the valve stem.

10. In an apparatus for securing valve stems to rubber tubes, a separating member adapted to lie within the tube, said separating member having a projection to indicate the location for the valve stem, a perforating punch alined with said indicating projection, said punch being provided with a cutting edge to perforate the tube in an area around said indicating projection, operating means to reciprocate said punch, said indicating projection being adapted to receive and hold the valve stem so as to locate the base of said valve stem in an area around the perforation, and a presser to force said base onto the tube, said presser having a central opening to receive the valve stem and a pressing element around said central opening, said presser being movable toward and away from said separating member to force the pressing element onto said base.

11. In an apparatus for applying and securing valve stems to rubber tubes, a separating member adapted to lie within the tube, said separating member having a projection on its top face to indicate the location for the valve stem, a vertically movable perforating punch in vertical alinement with said indicating projection, said punch being provided with a circular cutting edge to perforate the tube in an area around said indicating projection, an electrical heating element carried by said punch to heat said cutting edge, operating means to reciprocate said punch and heating element, said indicating projection being adapted to receive and hold the valve stem so as to locate the base of said valve stem in an area around the perforation, a yieldable presser to force said base onto the tube, said presser having a central opening to receive the valve stem and a yieldable pressing element around said central opening, and said yieldable presser being movable toward and away from said separating member to force the yieldable pressing element onto said base.

12. In an apparatus for applying and securing valve stems to predetermined clean areas of rubber tubes, a separating anvil adapted to extend into the tube so as to lie immediately below the clean area, said separating anvil having a combined valve stem holder and alining member projecting from its top face to elevate the portion of the tube above said combined holder and alining member, the tube being movable on said separating anvil to locate said clean area above said combined holder and alining member, a vertically movable perforating punch in vertical alinement with said combined holder and alining member, said punch being provided with a cutting edge to perforate the elevated portion of the tube in an area around said combined holder and alining member, operating means to reciprocate said punch, said combined holder and alining member, when exposed through the perforation, being adapted to receive and hold the valve stem so as to locate the base of said valve stem in an area around the perforation, and a presser to force said base onto the tube.

13. In an apparatus for applying and securing valve stems to predetermined clean areas of rubber tubes, a separating anvil adapted to extend into the tube so as to lie immediately below the clean area, said separating anvil having a combined valve stem holder and alining member projecting from its top face to elevate the portion of the tube above said combined holder and alining member, the tube being movable on said separating anvil to locate said clean area above said combined holder and alining member, a vertically movable perforating punch in vertical alinement with said combined holder and alining member, said punch being provided with a cutting edge to perforate the elevated portion of the tube in an area around said combined holder and alining member, operating means to reciprocate said punch, said combined holder and alining member, when exposed through the perforation, being adapted to receive and hold the valve stem so as to locate the base of said valve stem in an area around the perforation, a yieldable presser to force said base onto the tube, said presser having a central opening to receive the valve stem and a yieldable pressing element around said central opening, and said yieldable presser being movable toward and away from said separating anvil to force the yieldable pressing element onto said base.

14. In an apparatus for securing the base of a valve stem to a rubber tube, a pressing device comprising a presser member to engage said base, an operating member to actuate said presser member, and yieldable means uniting said members to permit automatic adjustment of the presser member on said base in response to the initial pressure of said presser member, said yieldable means including a thrust member carried by said operating member, and a coupling tiltably securing said presser member to said thrust member.

15. In an apparatus for securing the base of a valve stem to a rubber tube, a pressing device comprising a presser member to engage said base, an operating member to actuate said presser member, and yieldable means uniting said members to permit automatic adjustment of the presser member on said base in response to the initial pressure of said presser member, said yieldable means including a thrust member provided with a socket, a stem secured to said presser member and having its upper end in said socket, and a coupling loosely securing said stem to the thrust member to permit tilting of the presser member.

16. In an apparatus for securing the base of a valve stem to a rubber tube, a pressing device comprising a presser having an opening to receive the valve stem and a pressing face surrounding said opening, said pressing face being yieldable to conform to the base of the valve stem.

17. In an apparatus for securing the base of a valve stem to a rubber tube, a yieldable pressing device comprising telescoping presser members slidably secured together and having end faces adapted to engage said base, the inner presser member being provided with an opening to receive the valve stem.

18. In an apparatus for securing the base of a valve stem to a rubber tube, a yieldable pressing device comprising telescoping tubes having beveled bottom faces adapted to successively engage said base, the inner tube of the pressing device being extended downwardly to a position lower than the outer tube, and a spring yieldingly forcing said inner tube to said extended position, said telescoping tubes being slidably secured together so that the inner tube will engage and press the valve stem base before the outer tube contacts with said base.

19. In a device for perforating rubber, a heating chamber, an operating member detachably secured to the upper portion of said heating chamber, a perforating cutter detachably secured to the lower portion of said heating chamber, and an electrical heating element in said chamber to transmit heat to said perforating cutter.

JOHN A. FLEISCHLI.
JOSEPH M. KOUNTZMAN.